United States Patent [19]

Hancock

[11] Patent Number: 5,299,871

[45] Date of Patent: Apr. 5, 1994

[54] BEARING HOUSING ASSEMBLY

[75] Inventor: Roland J. Hancock, Northampton, England

[73] Assignee: Vickers PLC, London, United Kingdom

[21] Appl. No.: 30,137

[22] Filed: Apr. 26, 1993

[30] Foreign Application Priority Data

Feb. 21, 1991 [GB] United Kingdom ................. 9103596

[51] Int. Cl.⁵ ............................ F16C 9/02; F02F 7/00
[52] U.S. Cl. ................................ 384/432; 29/898.07;
123/195 R; 384/429; 384/434
[58] Field of Search ............... 384/294, 429, 430, 432,
384/433, 434; 123/195 R, 195 C, 195 H;
29/898.07, 898.09

[56] References Cited

U.S. PATENT DOCUMENTS

| | | | |
|---|---|---|---|
| 3,592,516 | 7/1971 | Standhardt | 384/432 |
| 3,790,236 | 2/1974 | Pierce | 384/430 |
| 4,189,193 | 2/1980 | Schumacher | |
| 4,721,077 | 1/1988 | Fukuo et al. | 123/195 R |

FOREIGN PATENT DOCUMENTS

| | | |
|---|---|---|
| 1268901 | 5/1968 | Fed. Rep. of Germany ...... 384/429 |
| 1954318 | 11/1970 | Fed. Rep. of Germany . |
| 2136631 | 2/1973 | Fed. Rep. of Germany . |
| 2154704 | 6/1973 | Fed. Rep. of Germany . |
| 1009977 | 11/1965 | United Kingdom . |
| 1265781 | 3/1972 | United Kingdom . |

Primary Examiner—Thomas R. Hannon
Attorney, Agent, or Firm—Lee, Mann, Smith, McWilliams, Sweeney, & Ohlson

[57] ABSTRACT

A bearing housing assembly comprising a generally U-shaped casing (12); a cap (13) which fits into and cooperates with the casing to define a bearing housing; and bolts (15) to hold the casing and the cap together. The cap (13) is a clearance fit in the casing (12); and a location and load transferring member (18) extends through a bore (22) whose cross-section extends partly into the casing and partly into the cap and which straddles the clearance (c), the location and load transferring member (18) being stressed to locate the cap within the casing.

11 Claims, 2 Drawing Sheets

BEARING HOUSING ASSEMBLY

The invention relates to a bearing housing assembly, particularly for use with internal combustion engines, for example to house a crank shaft bearing.

A typical bearing housing assembly is of the kind comprising a substantially U-shaped casing; a cap which fits into and cooperates with the casing to define a bearing housing; and fastening means to hold the casing and cap together. Such an assembly is hereinafter referred to as of the kind described.

In order for the bearing housing assembly to withstand the forces which are generated during operation of the engine, it is essential that the cap is firmly fitted to the casing. In the case of relatively low performance engines and the like, this has been achieved in the past by carefully machining the cap and casing to be a close fit and to use a number of bolts extending generally in parallel through the cap and into the casing. For higher performance or luxury cars and in particular racing car engines, a technique known as "cross-bolting" has been used in which a set of bolts generally orthogonal to the main bolts has been provided in addition. Examples of cross-bolting can be seen in GB-A-712307 and GB-A-1603957. In these cases also, however, it has been essential for the cap and casing to be a close fit and this has involved the need for very accurate machining of the components. If a clearance is found to exist, this has been dealt with in the past by employing shims and the like as described in GB-A-1009977.

The techniques which have been used for racing car engines and luxury cars have high machining costs and are not readily adaptable for relatively low cost, lower performance cars.

In accordance with a first aspect of the present invention, a bearing housing assembly of the kind described is characterised in that the cap is a clearance fit in the casing; and in that a location and load transferring member extends through a bore whose cross-section extends partly into the casing and partly into the cap and which straddles the clearance, the location and load transferring member being stressed to locate the cap within the casing.

We have devised a new approach in which a clearance is deliberately formed between the casing and the cap and a location and load transferring member extends through a bore between the casing and cap straddling the. clearance and, in the preferred example, on to which the cap and casing are tightened.

The member could be stressed by expanding it out into engagement with the cap and casing. Preferably, however, the fastening means draws the cap and casing together about the location and load transferring member which is compressed.

Leaving the clearance means that machining accuracy is not essential and indeed the surfaces defining the clearance could be left unmachined and in an as-cast condition in some cases. The bore can be machined or reamed to high accuracy at relatively low cost and the location and load transferring member can also be made to close tolerances relatively cheaply. The bearing housing assembly according to the invention is thus particularly suitable for use in low performance environments and allows the reinforcement feature of cross-bolting to be used also on road car and other engines without incurring the high costs associated with the machining required for racing car engines.

Preferably, there will be at least two location and load transferring members and corresponding bores. The or each such member will typically have a circular cross-section, possibly with flats, although other cross-sections are possible.

Although the fastening means could be provided by a single set of parallel fasteners such as bolts, preferably the fastening means comprises at least two fasteners which extend in transverse directions through the cap and casing. Thus the invention permits cross-bolting even though a clearance exists between the cap and casing.

In some cases, one of the fasteners will pass through the location and load transferring member. This is necessary where the casing and cap are relatively narrow. In other cases, where the casing and cap are wider, this will not be necessary.

In accordance with a second aspect of the present invention, a method of constructing a bearing housing assembly according to the first aspect of the invention comprises assembling a cap into a U-shaped casing and temporarily securing the cap to the casing with a clearance therebetween; providing at least one bore whose cross-section extends partly into the casing and partly into the cap and which straddles the clearance; inserting a location and load transferring member into the bore; and stressing the location and load transferring member so as to locate the cap in the casing.

The step of providing the bore preferably comprises a reaming process.

Preferably, bores in the casing and cap which receive the fastening means are formed prior to the assembly of the casing and cap.

One of the major advantages of the invention is that once the bore(s) have been formed, the cap and casing can be repeatedly disassembled and assembled while maintaining the integrity of bearing housing.

An example of a bearing housing assembly according to the present invention will now be described and contrasted with a known bearing housing assembly with reference to the accompanying drawings, in which.

Figure 1:
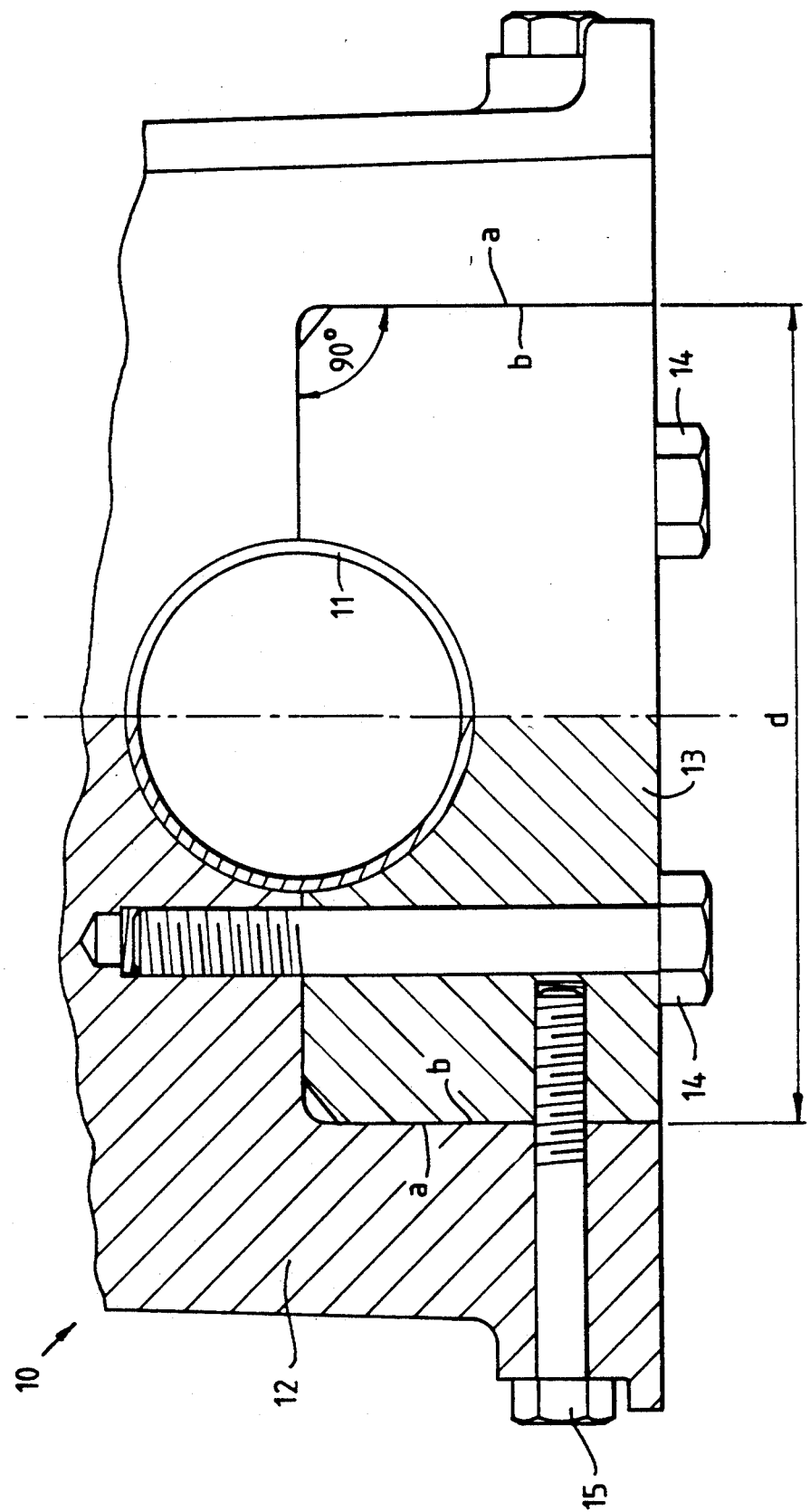
FIG. 1 is a part sectional view through a known bearing housing assembly.

The bearing housing assembly shown in FIG. 1 is for a crank shaft of a racing car engine. The assembly 10 comprises a main bearing 11 fitted within a main cylinder block or casing 12 and a main bearing cap 13.

The cylinder block 12 and main bearing cap 13 are attached to each other by vertically aligned main cap bolts 14. In order to reinforce this structure cross bolts 15 are also used to secure the main bearing cap to the cylinder block. This requires a very close tolerance over dimension "d" so that there is a good mating fit between the outside surfaces "a" of bearing cap 13 and the inside surfaces "b" of the cylinder block 12. It is also necessary to ensure that the 90° angles between the faces a and b and the top and bottom surface respectively of bearing cap and cylinder block are maintained also to a very tight tolerance.

As explained above, in order to achieve these very tight tolerances it has been necessary to undertake high cost machining and this has made the cross-bolting technique unsuitable for use in low performance engines.

Figure 2:
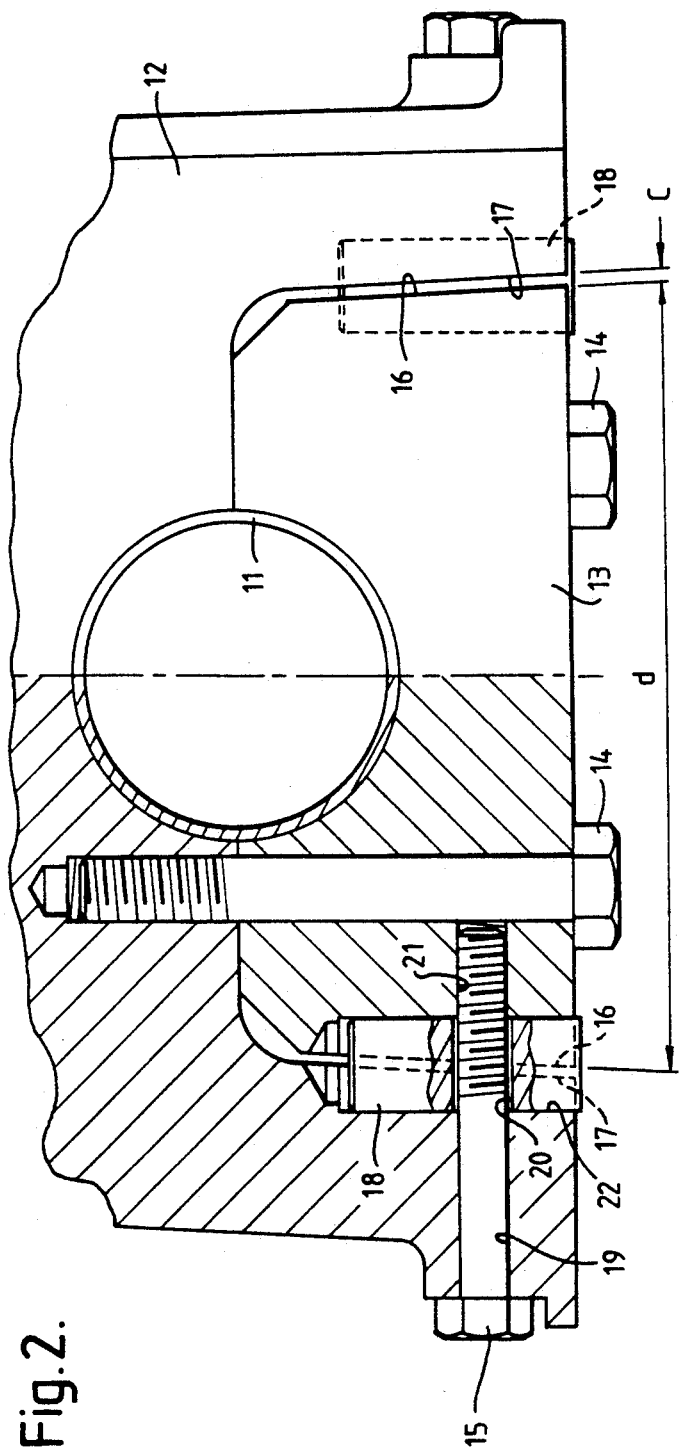
FIG. 2 is a part section similar to FIG. 1 but through an assembly according to the invention.

FIG. 2 illustrates an example of a housing assembly according to the invention. As before a main bearing 11 is located within a main bearing cap 13 and cylinder block 12 and with these items being attached by vertically aligned bolts 14. In this case, however, a clearance space "c" (typically 0.5-3.0 mm) is left between the outside surface 16 of cap 13 and inside surface 17 of cylinder block 12 and consequently there is no need for a tight tolerance over dimension "d". Neither is there any strict requirement to maintain accuracy of the angle between the mating walls of the block 12 and cap 13. Indeed it is now possible to leave the surfaces 16, 17 unmachined and/or leave these surfaces in the as-cast condition in which case a suitable draft angle (typically 3°) as seen in FIG. 2 is used when the block and cap are made from castings.

Figure 3:
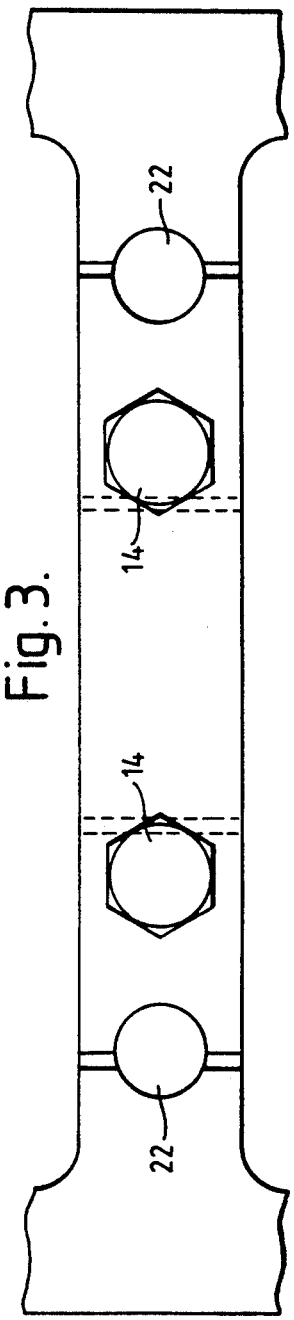
FIG. 3 is a plan of the assembly shown in FIG. 2.

In order to reinforce the structure 10 pin members 18 are inserted between cylinder block 12 and bearing cap 13. After assembly of the cylinder block 12 to bearing cap 13 with vertical bolts 14, holes 22 are drilled and reamed vertically between block 12 and cap 13. A metal, for example steel, pin muffler 18 is then inserted within each hole. The pins 18 and the holes can be machined to close tolerances without much additional expense so that each pin is a close fit within the hole. A cross bolt 15 is then inserted through aligned holes 19 and clearance holes 20 in the block 12 and pins 18 respectively and tightened into screwed holes 21 in cap 13 so as to compress the pins 18. The close fit of pin 18 within hole 22 facilitates the transfer of load between the cap and the block and accurately locates the cap and block. The use of pin is thus allows the engine structure 10 to be reinforced by means of cross bolts 15. Where the cap structure is of narrow dimensions as shown in FIG. 3 it is preferable that the cross bolt 15 goes through pin member 18. In a wider cap structure, however, two cross bolts could be used straddling each pin member so that there is no necessity for the cross bolt 15 to penetrate the pin member 18.

The assembly of FIGS. 2 and 3 is manufactured by mounting the cap 13 and block 12 together and fixing them with the bolts 14. The holes 22 are then machined and pins 18 inserted. Cross-bolts 15 are inserted to secure the cap 13 to the block 12 as described above. A bore for the main bearing 11 is then formed. The cap and block can then be disassembled and assembled repeatedly since the pins 18 will ensure accurate repositioning of assembly and the integrity of the main bearing bore can be maintained.

I claim:

1. A bearing housing assembly comprising a substantially U-shaped casing (12) ; a cap (13) which fits into and cooperates with the casing to define a bearing housing; and fastening means (15) to hold the casing and the cap together characterised in that the cap (13) is a clearance fit in the casing (12); and in that a location and load transferring member (18) extends through a bore (22) whose cross-section extends partly into the casing and partly into the cap and which straddles the clearance (c), the location and load transferring member (18) being stressed to locate the cap within the casing.

2. An assembly according to claim 1, wherein the bore (22) and location and load transferring member (18) have substantially circular cross-sections.

3. An assembly according to claim 1, the assembly comprising at least two location and load transferring members (18) and corresponding bores (22).

4. An assembly according to claim 1, wherein the fastening means (15) comprises at least two fasteners which extend in transverse directions through the cap and the casing.

5. An assembly according to claim 4, wherein one of the fasteners (15) extends through the location and load transferring member (18).

6. An assembly according to claim 1, wherein the fastening means (15) draws the cap and casing together about the location and load transferring member (18) which is compressed.

7. An internal combustion engine incorporating a bearing housing assembly according to claim 1.

8. A method of constructing a bearing housing assembly according to claim 1, the method comprising assembling a cap (13) into a U-shaped casing (12) and temporarily securing the cap to the casing with a clearance therebetween; providing at least one bore whose cross-section extends partly into the casing and partly into the cap and which straddles the clearance; inserting a location and load transferring member (18) into the bore; and stressing the location and load transferring member so as to locate the cap in the casing.

9. A method according to claim 8, wherein the step of providing a bore (22) for the location and load transferring member (18) comprises a reaming process.

10. A method according to claim 8, wherein bores (19,21) in the cap and casing which are to receive fasteners are formed prior to assembling the cap and casing together.

11. A method according to claim 8, wherein the stressing step comprises drawing the cap (13) and casing (12) together about the location and load transferring member (18) with fastening means (15) so as to compress the member.

* * * * *